United States Patent Office

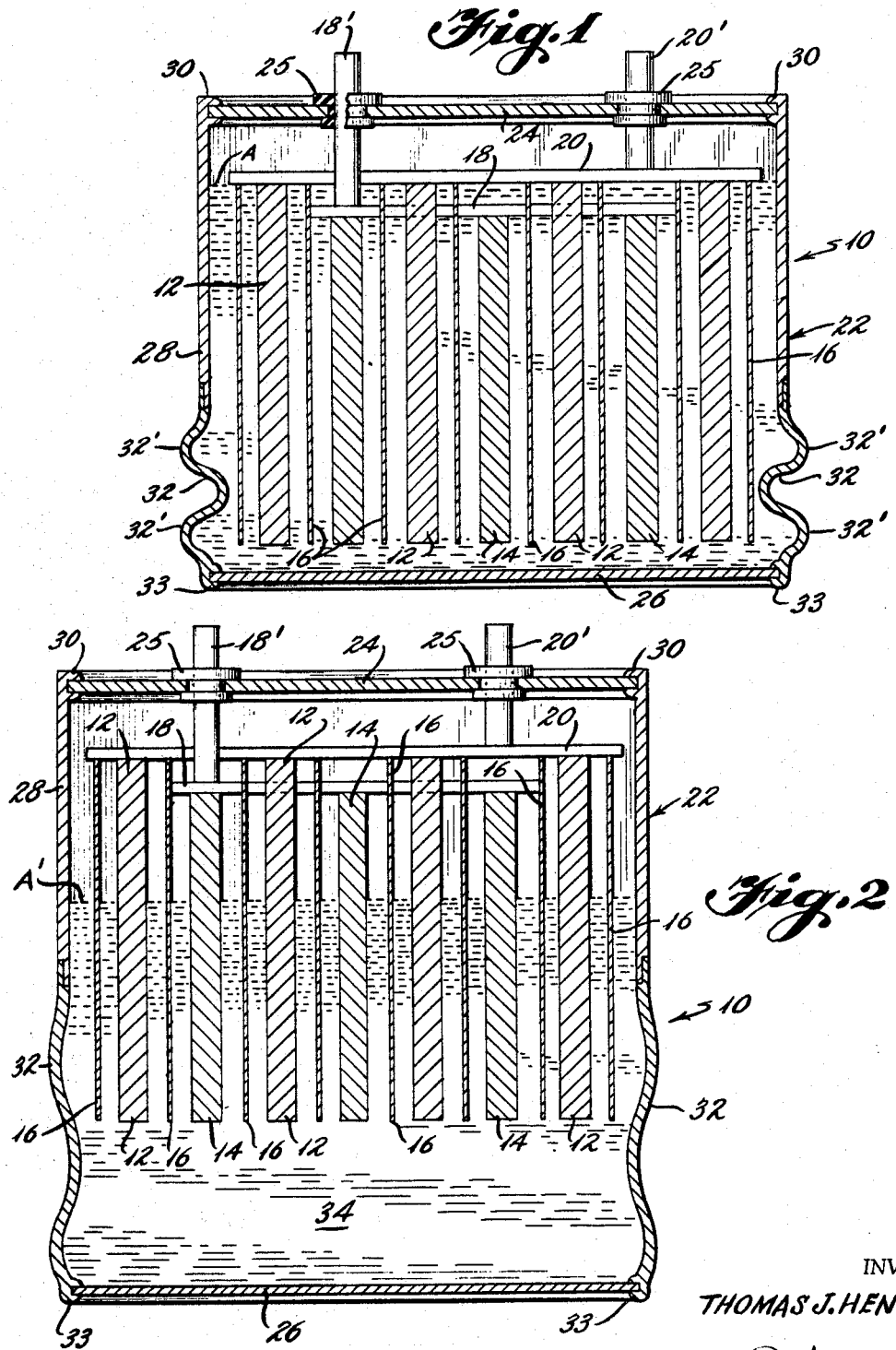

3,390,017
SEALED ELECTROCHEMICAL CELL PROVIDED WITH A FLEXIBLE CASING
Thomas J. Hennigan, West Hyattsville, Md., assignor to the United States of America as represented by the Administrator of the National Aeronautics and Space Administration
Filed Oct. 22, 1965, Ser. No. 502,756
3 Claims. (Cl. 136—166)

ABSTRACT OF THE DISCLOSURE

An improved casing structure for an electrochemical cell for enabling the lowering of the electrolyte level in the cell during the recharging cycle to better insure the proper recombination of gases at the electrodes. Essentially, the casing has as an integral part thereof a bellows section capable of expanding during the recharging cycle as the pressure increases due to a release of gases from the electrodes, and contracting upon a subsequent decrease of pressure due to the recombination of the gases, thereby effecting a lowering and a raising of the electrolyte level within the cell.

---

The invention described herein may be manufactured and used by or for the Government of the United States of America for governmental purposes without the payment of any royalties thereon or therefor.

This invention relates to an electrochemical cell and particularly concerns a novel casing structure for varying the electrolyte level in the cell.

Electrochemical cells such as silver oxide-zinc, silver oxide-cadmium, nickel-cadmium, and lead-lead dioxide are generally starved of electrolyte, i.e., the amount of liquid electrolyte is limited so that the separator material within the cell is wetted with electrolyte and there is little or no free electrolyte within the cell. It is common practice to construct the cell so that the positive electrode becomes charged first and there evolves oxygen which will recombine at the negative electrode. By having a starved condition, the oxygen gas can reach the negative electrode more readily, thereby limiting the pressure increase due to gassing in a sealed cell, thus preventing rupture of the cell container. It is well known that if the cell is flooded with electrolyte the recombination process is restricted to such a degree that high gas pressures and possibly cell ruptures will result.

However, it was found that limiting the free electrolyte to a starved electrolyte condition in a cell produced many problems such as (1) loss of cell capacity; (2) poor voltage regulation or discharge; (3) high internal impedance; (4) poor heat transfer; and (5) the possibility of hot spots within the cell due to the near dry condition of the separators.

Attempts have been made to design batteries to permit the use of free electrolyte while the battery is being discharged and then to remove some of the electrolyte as charging was taking place. Most of these designs required separate compartments in the batteries or external elements such as bladders to receive the excess electrolyte. These additional elements were generally costly and some did not always remove the electrolyte at the right time while others required manual movement of the battery or a valve to return the electrolyte after completion of the charging process.

The general object of this invention is to provide an electrochemical cell or battery which allows the use of free electrolyte and which embraces all of the advantages of similarly employed cells and which possesses none of the aforementioned disadvantages.

A more specific object of the present invention is to provide a circulation device for electrolyte in a cell.

Another specific object is to provide means to permit a cell to have a full electrolyte condition when discharging and a starved condition as the battery nears full charge.

A still further object is to provide an electrochemical cell with an expansible casing for circulating electrolyte.

Still another object is to provide a battery with a casing having attached bellows which will expand upon gassing of the electrodes to remove some of the free electrolyte around the electrodes.

Other objects and advantages of the instant invention will become apparent upon a close reading of the following detailed description of the preferred embodiment of the invention, reference being had to the accompanying drawing wherein:

FIG. 1 is a side elevational sectional view of a cell embodying the invention; and FIG. 2 is a view similar to FIG. 1 showing the invention in expanded condition.

Referring specifically to the drawings wherein like reference characters designate like or corresponding parts throughout the several views, there is shown in FIGS. 1 and 2 an electrochemical cell generally designated 10. This cell may be of any of the usual types such as silver oxide-zinc, silver oxide-cadmium, nickel-cadmium, and lead-lead dioxide. Although a cell will be discussed in illustrating the preferred embodiment, it must be realized that a complete battery system can also be utilized here. The cell 10 comprises negative electrodes 12 and positive electrodes 14 separated by separators 16. The separators 16 are usually porous or perforated and can be corrugated or ribbed. The particular material used for the separator depends on the particular electrolyte utilized. For example, if an acid electrolyte is used, the separator must be made of material which will not disintegrate in the acid and which will be chemically inert, as for instance hard rubber, glass, wool or plastic material. In an alkaline storage cell, such as a nickel-cadmium cell, the electrolyte is usually a 30% solution of potassium hydroxide. Separators for this type cell must be made of alkaline-resistant material, such as polyamides and phenolic resins. Connected to the electrodes 12, 14 are conductors 18, 20, respectively. Conductor 18 terminates in a common terminal 18' and conductor 20 terminates in a common terminal 20'. These details are in accordance with standard design and need no further explanation.

Enclosing the electrodes is a casing 22 having an upper portion 24, a base portion 26 and side portion 28. The casing 22 may be of any cross-sectional configuration such as rectangular or circular. Terminal 18', 20' extend through upper portion 24 and are insulated from the casing by insulators 25. Upper portion 24 is sealed to side portion 28 by suitable means such as welding as indicated at 30. Side portion 28 includes an expansible bellows-like section 32 formed of expansible folds 32'. Bellows section 32 may be integrally formed with side portion 28 or may be attached thereto by suitable means such as epoxy sealers, continuous binders, welding, etc. As shown, the lower end of the bellows section 32 is attached to base portion 26 by suitable means such as welding as indicated at 33. However, the bellows section 32 need not be formed as the lower part of side portion 28 and may instead be located at any point along the side portion. The casing 22 and bellows-like portion 32 must be made of a material resistant to the electrolyte 34 contained within the casing. In addition, the bellows-like portion 32 is generally made of a resilient material such as rubber, plastic or flexible metal that is commonly used as a diaphragm material.

Alternatively, the cell casing 22 may be described as comprising an upper member and a lower member. The upper member is composed of upper portion 24 and the upper half of side portion 28. The lower member is composed of base portion 26 and the lower half of side portion 28.

In operation, the cell is filled with suitable electrolyte to a level completely covering the electrodes 12, 14 such as shown at A in FIG. 1. When the cell is being recharged, gases are released from the electrodes and bubble up through the electrolyte. In order to have proper recombination of the gases the electrodes must be exposed. As the cell is being charged, pressure build-up due to this gassing will occur causing expansion of the bellows 32 which by increasing the volume of the casing will reduce the level of electrolyte to that shown in A′ in FIG. 2 thereby exposing a substantial portion of electrodes 12, 14. When the gas recombines on discharge with the resultant pressure decrease, the bellows will contract, thereby raising the electrolyte level, resulting in improved discharge characteristics of the cell.

As can be seen, the bellows provides a means of effectively recirculating the electrolyte confined within the cell, without the necessity of manual operation.

It will be understood that the invention is not to be limited to the exact construction shown and described in the preferred embodiment of this invention and various changes and modifications may be made without departing from the spirit and scope of the invention as defined in the appended claims.

What is claimed is:

1. A sealed electrochemical cell including a casing, with an electrolyte and at least two electrodes therein, said casing having upper, side, and base portions formed as a single chamber integral construction, said electrodes being suspended from said upper portion, said side portion being provided with flexible means for allowing an increase in the volume of said chamber by an upward movement of said upper portion, whereby expansion of said flexible means of said side portion of said casing, due to pressure increase within the cell, increases the volume of the cell and thereby lifts the electrodes in said cell with respect to the electrolyte.

2. The sealed electrochemical cell of claim 1 wherein said side portion comprises an upper section and a lower section, said lower section being said flexible portion of said casing.

3. The sealed electrochemical cell of claim 2, wherein said lower section is formed as a bellows of a plurality of folded parts.

References Cited
UNITED STATES PATENTS

| | | | |
|---|---|---|---|
| 1,823,709 | 9/1931 | Taylor | 136—140 XR |
| 2,131,592 | 9/1938 | Lange et al. | 136—179 |
| 2,733,389 | 1/1956 | Ellison | 136—166 X |
| 2,850,556 | 9/1958 | Hermitte | 136—91 |

FOREIGN PATENTS

| | | |
|---|---|---|
| 544,627 | 6/1921 | France. |

WINSTON A. DOUGLAS, *Primary Examiner.*

DONALD L. WALTON, *Assistant Examiner.*